United States Patent
Hayes et al.

(10) Patent No.: US 9,161,275 B2
(45) Date of Patent: Oct. 13, 2015

(54) LOW LATENCY 802.11 MEDIA ACCESS

(71) Applicant: QUALCOMM Incorporated, San Diego, CA (US)

(72) Inventors: Kevin Neal Hayes, Mountainview, CA (US); Prerepa Viswanadham, Fremont, CA (US); Mahesh Dandapani Iyer, Saratoga, CA (US); Amit Shukla, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 13/925,794

(22) Filed: Jun. 24, 2013

(65) Prior Publication Data
US 2014/0254552 A1 Sep. 11, 2014

Related U.S. Application Data

(60) Provisional application No. 61/774,886, filed on Mar. 8, 2013.

(51) Int. Cl.
*H04W 4/00* (2009.01)
*H04W 36/16* (2009.01)
*H04W 74/08* (2009.01)

(52) U.S. Cl.
CPC .............. *H04W 36/16* (2013.01); *H04W 74/08* (2013.01); *H04W 74/0816* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,570,624 B2 | 8/2009 | Shapira | |
| 7,948,939 B2 | 5/2011 | Sugaya et al. | |
| 7,974,256 B2 | 7/2011 | Sugaya et al. | |
| 2006/0252449 A1* | 11/2006 | Ramesh | 455/522 |
| 2007/0064670 A1 | 3/2007 | Lee et al. | |
| 2010/0202327 A1 | 8/2010 | Mushkin et al. | |
| 2012/0127937 A1 | 5/2012 | Singh et al. | |
| 2014/0169290 A1* | 6/2014 | Seok | 370/329 |

FOREIGN PATENT DOCUMENTS

| | | |
|---|---|---|
| EP | 1589704 A2 | 10/2005 |
| EP | 2051559 A2 | 4/2009 |
| WO | 2010043949 A1 | 4/2010 |

OTHER PUBLICATIONS

International Search Report and Written Opinion—PCT/US2014/018384—ISA/EPO—Jun. 6, 2014.

* cited by examiner

*Primary Examiner* — Frank Duong
(74) *Attorney, Agent, or Firm* — Arent Fox LLP

(57) ABSTRACT

A method, an apparatus, and a computer program product for wireless communication are provided. The apparatus may comprise a transceiver configured to transmit uplink frames and receive downlink frames in a first transaction slot of a super-frame. The one or more of the uplink frames and the downlink frames are associated with over-allocated network allocation vectors that reserve a transmission time which exceeds a time required to transmit acknowledgements of the one or more downlink frames or receive acknowledgement of the one or more uplink frames, respectively. The apparatus may comprise a processing system configured to cause the transceiver to transmit a first uplink frame to the access point with a first over-allocated NAV, to establish a start-time for the super-frame and to extract data from two or more downlink frames in a burst received from the access point.

36 Claims, 7 Drawing Sheets

LOW LATENCY 802.11 MEDIA ACCESS

This application claims priority to U.S. Provisional Patent Application Ser. No. 61/774,886 filed Mar. 8, 2013 entitled "Low Latency 802.11 Media Access" which is incorporated by reference herein in its entirety.

BACKGROUND

1. Field

The present disclosure relates generally to communication systems, and more particularly, to handoffs between access points in wireless networks.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include IEEE 802.11 (Wi-Fi), IEEE 802.16 (WiMAX), IEEE 802.20, code division multiple access (CDMA) systems, time division multiple access (TDMA) systems, frequency division multiple access (FDMA) systems, orthogonal frequency division multiple access (OFDMA) systems such as Flash-OFDMA, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. However, as the demand for mobile broadband access continues to increase, there exists a need for further improvements in the underlying technology. Preferably, these improvements should be applicable to various multi-access technologies and the telecommunication standards that employ these technologies.

For example, there is significant interest in systems and methods for offloading certain services delivered by cellular networks to Wi-Fi networks. However, certain issues are observable, including issues related to interruptions causes by handoffs between access points (APs). The Institute of Electrical and Electronic Engineers (IEEE) have promulgated certain standards, such as IEEE 802.11r, that introduce mechanisms for "fast handoff" across managed APs. However, these and other standards assume that there is a trust relationship across the APs involved in handoffs, and the APs used for cellular offload may not be in the same trusted network. Accordingly, the standards-based approaches cannot be used.

SUMMARY

In an aspect of the disclosure, a method, a computer program product, and an apparatus are provided. The apparatus may comprise a transceiver configured to transmit uplink frames to an AP in a first transaction slot of a super-frame, and to receive downlink frames from the access point in the first transaction slot of the super-frame. The one or more of the uplink frames and one or more of the downlink frames are associated with over-allocated network allocation vectors (NAVs) that reserve a transmission time which exceeds a time required to transmit acknowledgements of the one or more downlink frames or receive acknowledgement of the one or more uplink frames, respectively.

In an aspect of the disclosure, the apparatus may comprise a processing system configured to cause the transceiver to transmit a first uplink frame to the access point with an over-allocated uplink NAV. The processing system may be configured to establish a start-time for the super-frame coincident with the start of the first uplink frame if the access point acknowledges the first uplink frame. The processing system may be configured to extract data from two or more downlink frames in a burst received from the access point after the access point acknowledges the first frame, wherein the two or more downlink frames are associated with an over-allocated downlink NAV. The transceiver is configured to ignore the over-allocated downlink NAV.

In an aspect of the disclosure, the access point is configured to ignore the over-allocated uplink NAV.

In an aspect of the disclosure, the processing system may be configured to power down the transceiver after the first transaction slot until the end of the super-frame. The transceiver may transmit at least one uplink frame during a first transaction slot of a next super-frame. The processing system may be configured to repetitively cause the transceiver to retransmit the first uplink frame to the access point with the over-allocated uplink NAV after a predefined minimum delay if the access point does not acknowledge receipt of the first uplink frame.

In an aspect of the disclosure, the processing system may be configured to establish the start-time for the super-frame through contention if the access point does not acknowledge receipt of the first uplink frame. The transceiver may be configured to transmit a burst of uplink frames to the access point in the first transaction slot after receiving the downlink frames from the access point. The burst of uplink frames may be transmitted to the access point with a NAV that is not over-allocated. In an aspect of the disclosure, the over-allocated NAVs may exceed a time required to transmit acknowledgements of the one or more downlink frames or receive acknowledgement of the one or more uplink frames by at least one frame duration.

In an aspect of the disclosure, the access point serves a plurality of ATs and wherein each of the plurality of ATs may recognize a different start-time for the super-frame.

BRIEF DESCRIPTION OF THE DRAWINGS

These and other aspects of the disclosure will be described in the detailed description, in the appended claims that follow, and in the accompanying drawings, wherein:

Figure 1:
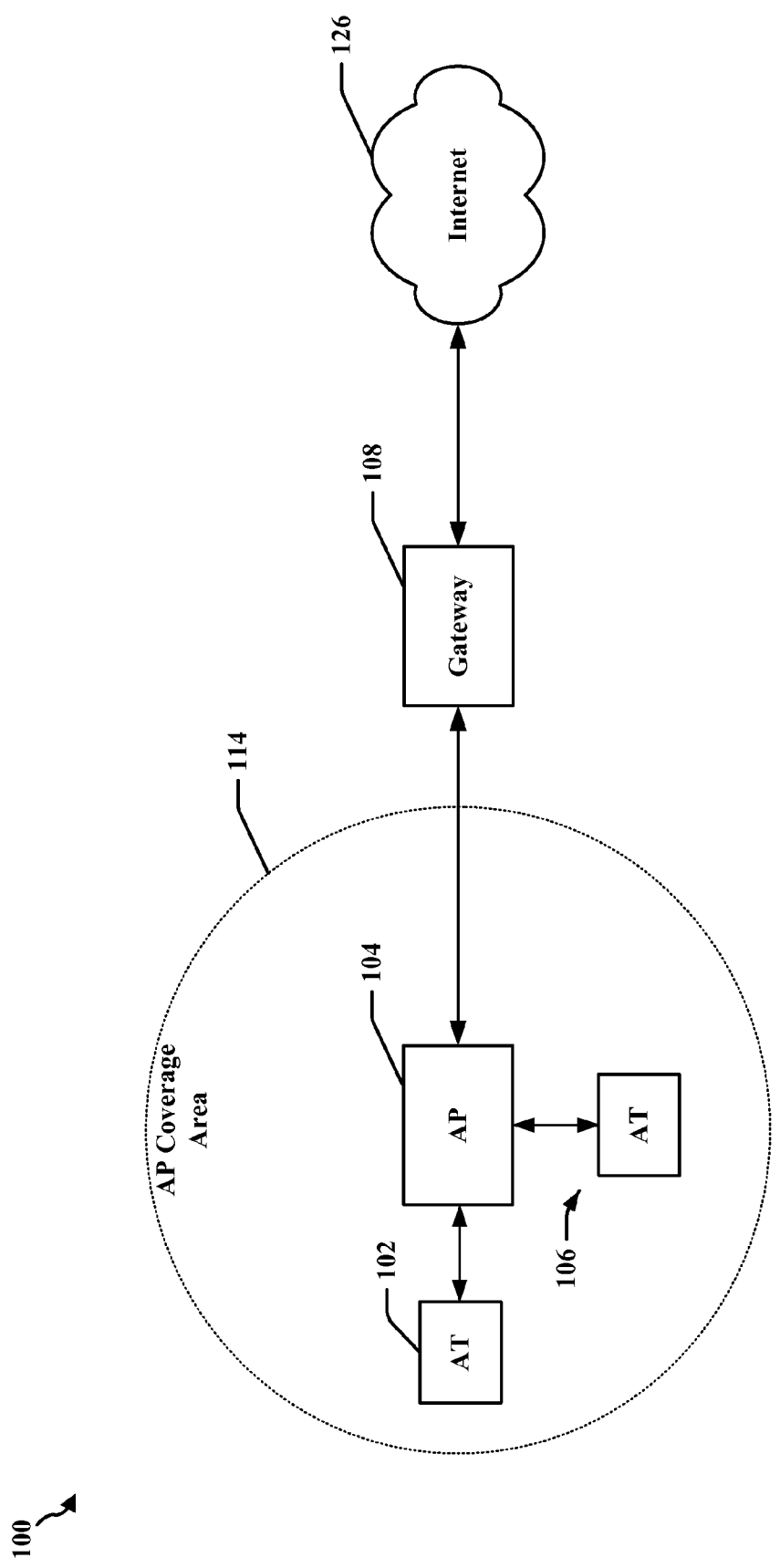
FIG. 1 is a diagram illustrating a wireless access network.

In accordance with common practice the various features illustrated in the drawings may be simplified for clarity. Thus, the drawings may not depict all of the components of a given apparatus (e.g., device) or method. In addition, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), TDMA, OFDMA systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point (AP) may comprise, be implemented as, or known as a Node B, Radio Network Controller (RNC), evolved Node B (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

An access terminal (AT) may comprise, be implemented as, or known as a subscriber station, a subscriber unit, a mobile/wireless device, a mobile station (MS), a remote station, a remote terminal, a remote device or unit, a user terminal (UT), a user agent, a user device, user equipment (UE), a user station, a wireless device, a wireless communications device, a mobile subscriber station, a handset, a user agent, a mobile client, a client, or some other terminology. In some implementations, an AT may comprise a cellular telephone, a cordless telephone, a Session Initiation Protocol (SIP) phone, a wireless local loop (WLL) station, a personal digital assistant (PDA), a handheld device having wireless connection capability, a Station (STA), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a multimedia device, a video device, a digital audio player (e.g., MP3 player), a camera, a game console, a tablet, or any other similar functioning device), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 is a diagram illustrating an architecture of a wireless network 100. The wireless network 100 may include one or more ATs (e.g., Mobile Devices) 102, 106, one or more APs 104, which provide wireless communications in coverage area 114 and connects to the Internet 126 through gateway 108. AP 104 may support wireless local area network (WLAN) services using one or more radio access technologies, wherein the services may include access to a wide area network, such as the Internet 126. Gateway 108 may be assigned a subnet comprising a block of addresses, such as Internet Protocol (IP) addresses which may be assigned for use with one or more ATs 102 and/or 106, AP 104 and/or other equipment in wireless network (e.g., WLAN).

AP 104 may communicate with ATs 102 and 106 using the same or different radio access technologies. AP 104 may be part of a wireless network 100 provided by a single operator, and access to the operator's IP Services 126 may be provided through the gateway 108.

As illustrated by the examples described herein, the wireless network 100 may provide packet-switched services; however, as those skilled in the art will readily appreciate, the various concepts presented throughout this disclosure may be extended to networks providing circuit-switched services. One or more of network entities 104, 106, and/or 108 may be connected through wireless or wired connections, which may be referred to as backhaul connections.

The modulation and multiple access scheme employed by the wireless network 100 may vary depending on the particular telecommunications standard being deployed and different modulation schemes may be used for uplink (UL) and downlink (DL) communication. According to certain aspects, OFDM is used on the DL and SC-FDMA is used on the UL to support both frequency division duplexing (FDD) and time division duplexing (TDD). As those skilled in the art will readily appreciate from the detailed description to follow, the various concepts presented herein may be readily extended to various telecommunication standards employing different modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

AP 104 may have multiple antennas enabling the AP 104 to exploit the spatial domain to support spatial multiplexing, beamforming, and transmit diversity. Spatial multiplexing may be used to transmit different streams of data simultaneously on the same frequency. The data steams may be transmitted to a single AT 102 to increase the data rate or to multiple ATs 102 and 106 to increase the overall system capacity. This may be achieved by spatially precoding each data stream (i.e., applying a scaling of an amplitude and a phase) and then transmitting each spatially precoded stream through multiple transmit antennas on the DL. The spatially precoded data streams arrive at the AT 102 with different spatial signatures, which enables each AT 102 or 106 to recover the one or more data streams destined for that AT 102 or 106. On the UL, each AT 102 may transmit a spatially precoded data stream, which enables the AP 104 to identify the source of each spatially precoded data stream.

According to certain aspects of the invention, each link pair may use multiple traffic classes in both uplink and downlink directions to achieve the application goals. The AP 104 typically experiences a heavy traffic burden because AP 104 can support multiple ATs 102 and 106. Accordingly, certain embodiments employ a protocol that assigns the burden of media access contention to client ATs 102 and 106. According to certain aspects of the protocol, each of the client ATs 102 and 106 rely on uplink polling of AP 104 such that traffic through the AP 104 is never in contention for client AT 102 and 106 accesses. Contention may be allowed and/or limited to a first frame communicated between AT 102 and/or 106 AP 104 in order to allow multiple controllers to compete for a time slot of a super-frame structure, as timed by AT 102 and/or 106. Contention may then be disabled for other frames in the super-frame in order to create a "winner take all" effect for the time slot owner.

Certain advantages may be accrued from the use of the disclosed protocols. For example, power saving opportunities may be enhanced by reducing contention and eliminating certain signaling between each client AT 102 and/or 106 and a serving AP 104. In another example, each client AT 102 and/or 106 can control its own sleep schedule. A super-frame may define a period of time in which client ATs 102 and 106 contend to perform at least one transaction. An AT 102 or 106 may migrate to a slot where the probability of contention with other controllers is significantly reduced and, having discovered such available slot, may establish the slot as the start of the super-frame, from its perspective. As used herein, the terms transaction and time slot (or slot) may relate to a period of time in which both client AT 102 and AP 104 exchange a set of frames. The set of frames may comprise a limited number of frames, which may include one frame per traffic class.

In certain embodiments, downlink and/or uplink data may be delivered in bursts of frames rather than in single frames during timeslots that are identified when the AT 102 is already awake. Certain embodiments, employ an unscheduled automatic power save delivery (U-APSD) scheme, in which one endpoint may perform polling to quickly obtain traffic queued by other endpoint. A network allocation vector (NAV) may be used to inform third-party nodes of a predicted transmission duration by one of two endpoints in a link.

Figure 2:
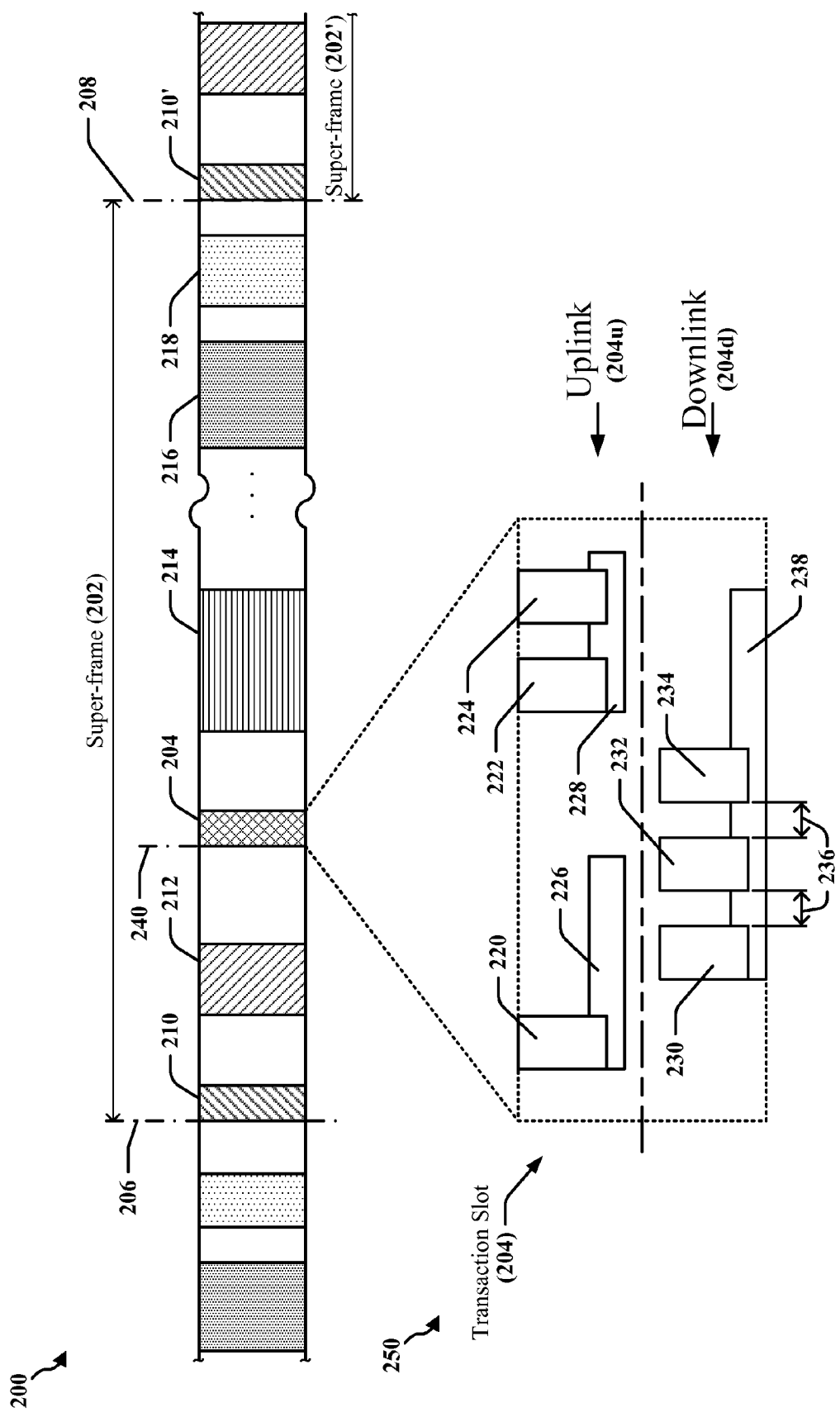
FIG. 2 is a timing diagram illustrating a super-frame.

FIG. 2 is a timing diagram 200 that illustrates a super-frame 202 that defines transmissions within a period of time between frame boundaries 206 and 208. Super-frame 202 may comprise slots in which an AT 102 can transmit uplink data to an AP 104 and in which AT 102 can receive downlink data from the AP 104. Each slot of the super-frame 202 is usable by only one AT 102 or 106. As depicted in FIG. 2, not all slots of super-frame 202 may be used and slots that carry information may occur in clusters 210, 212, 214, 216, and 218. Super-frame 202 has a predefined length and number of slots, and each slot repeats at an interval equal to the period of the super-frame 202.

Super-frame 202 may encapsulate transactions between the AP 104 and each of its client ATs 102 and 106. For the purpose of this description, each transaction occupies and is coincident with a single slot (referred to as a transaction slot, for clarity), although in some embodiments, a transaction may occupy a plurality of slots. Typically, each AT 102, 106 can engage in one transaction for each super-frame, and the transaction can include both uplink and downlink data transmissions.

The start of a super-frame is determined independently by each AT 102 or 106 as the start of the slot used by AT 102 or AT 106, respectively. In the example of FIG. 2, AT 102 determines its own frame boundaries 206 and 208 such that the start 206 of super-frame 202 coincides with the start of a transaction slot used by AT 102. AT 102 may become active and begin transmitting in a first transaction slot at, or shortly after the occurrence of super-frame boundary 206 defined by AT 102. After completion of a transaction in transaction slot 210, AT 102 may hibernate or otherwise power-down until the next frame boundary 208 when AT 102 may awaken and acquire in transaction slot 210' to initiate a second transaction with AP 104.

AT 102 typically acquires its super-frame timing through a contention-based process. When AT 102 first becomes active in the network, it may attempt to transmit during a first available transaction slot and/or frame. If a collision is detected, the AT 102 may back off for a predetermined delay and attempt to acquire the next available slot after the delay. Collisions may be detected when an acknowledgement (ACK) of transmission of an initial frame in the transaction is not received by AT 102 after a predetermined timeout period. The ACK timeout period may be determined based on the time at which a transmitter and other nodes assume an ACK transmission by the AP 104 would start after AT 102 or another AT 106 has transmitted an initial frame. In some embodiments, the ACK timeout period may be calculated as the sum of the smallest interframe space (SIFS) and one slot time. In one example, a 16 microsecond SIFS and 9 microsecond slot time yields a 25 microsecond ACK timeout.

The AP 104 acts a client or slave, responding to initial transmissions of the transactions of APs 102, 106. Each of the AP 104 and ATs 102, 106 can communicate using the superframe protocol with knowledge of super-frame timing and transaction slot configuration. As described herein, AT 102 may determine its start 206 of its super-frame 202 based on the start time of an acquired slot and the AT 102 may then assume responsibility for initiating transactions at the start 208 of each subsequent super-frame 202' based on the system-defined super-frame period and the AT 102 determined start 206 of super-frame 202. Under this approach, AT 102 engages in transactions in the first transaction slot 210, 210' of each super-frame 202, 202' based on the perspective of the AT 102. AT 106 may define the start 240 of its super-frame as occurring at the start of transaction slot 204.

Within respective transaction slots, AP 104 and ATs 102, 106 may transmit data as bursts in a series of frames. A receiving node transmits an ACK after each frame and the inter-frame spacing 204 may be calculated as the sum of the ACK transmission time and two SIFS times. In an example where the ACK is transmitted at 24 Mbps, each frame is separated by exactly 60 microseconds. An arbitrated inter-frame space (AIFS) may be defined that is measured in integral slot times beginning after 1 SIFS time.

In some embodiments, framing is adapted to fit traffic into 1500 octet frames. In one example, downlink video is framed as 983 bytes every 8 milliseconds rather than the 6144 bytes every 50 milliseconds specified in certain standards. Data may be exchanged in a predetermined maximum number of uplink and downlink frames in each transaction slot. In one example, a maximum of 3 uplink and 3 downlink frames is provided per transaction slot, as depicted in FIG. 2.

FIG. 2 includes an expanded view 250 of one transaction slot 204, showing the relationship between uplink transmission 204*u* and downlink transmissions 204*d* for an AT 106. FIG. 2 does not explicitly depict ACK transmission. AT 106 transmits an initial packet 220 with an over-allocated NAV 226. Over-allocated NAV 226 indicates to other potential transmitters that AT 106 intends to transmit for a period of time longer than the expected transmission period of frame 220, thereby providing sufficient time to allow AP 104 to begin transmission of at least first frame 230 without potential for collision. AP 104 is configured to ignore NAV 226, whereas other potential transmitters refrain from transmitting, thereby avoiding collision. AP 104 may transmit a plurality of frames 230, 232, and 234 with a NAV 238, which is sufficiently long to prevent a collision between third-party transmitters and the transmission of frame 222 by AT 106. AT 106 may ignore NAV 238 and transmit uplink data in frames 222 and 224.

The use of over-allocated NAVs 226 and 238 enables collision free communication of at least frames 222, 224, 230, 232, and 234 and may significantly reduce power usage by the AT 106 as a consequence. Each frame transmitted may be acknowledged by the receiver. Standards-based U-APSD may be adapted and employed to facilitate low-latency uplink-downlink and downlink-uplink UL transitions which may enable a shorter reply time than conventional system which are limited by a sum of SIFS, ACK and Point Coordination Function Interframe Space (PIFS). NAVs 226 and 238 may be over-allocated by at least 1 minimal-sized frame duration used during the transmission rate used during the most recent successful transaction performed by AP 104 and AT 106. In some embodiments, either endpoint 104 or 106 may optionally send a contention free (CF)-end message to abort NAV for better coexistence with conventional networks.

As described herein, in one example embodiment, client ATs 102, 106 may control their wakeup schedule. Initial wakeup schedule may be mandated or suggested by AP 104 through a Serv Discovery response frame. Moreover, after transmitting the last successful frame of each transaction, a client AT 102, 106 may calculate the next wakeup instance as:

Next wake time=$T_{Superframe} - T_{TransWidth} - T_{Overwake} - T_{wakelatency}$ where:

$T_{Superframe}$=width of super frame 202
$T_{Transwidth}$=overall time of transaction 204
$T_{overwake}$=Time needed by client AT 102, 104 to remain awake for non-transmission activities
$T_{wakelatency}$=Time needed by client to awaken before next transaction starts, mostly to start up XTL.

In some embodiments, connection, enroll, and/or service discovery frames may be sent by AT 102, 106 at any time and/or independently of any super frame, although AP 104 may respond according to its own schedule. The client AT 102, 106 is typically configured to tolerate any resultant latency for connection establishment.

In some embodiments, a flag may be set to enable data bursting and/or to signify burst termination. In one example, a "MoreData" bit may be used.

In FIG. 2, uplink traffic 204*u* may be divided into a plurality of types, including trigger frame 220 and burst frames 222, 224. In conventional systems, both types of frames may incur retries, but implementation of certain aspects of the presently disclosed protocol can prevent deferral. Triggers 220 may optionally be divided into low latency and other triggers. In one example, 3 access parameter settings may be required. In some embodiments, frequent periods of near complete network reservation may occur.

In some embodiments, the AT 102 or 106 need not transmit Null frames if, for example, one or more of frames 222 and 224 are not transmitted after transmission of the trigger frame 220. The AT 102 or 106 may sleep as soon as last packet is received and acknowledged.

A low latency data class access can be prioritized above other data classes. In one example, AT 102 and/or 106 comprises a game controller that transmits and/or receives different classes of data, for which different retry strategies may be applied. For example, transmissions of audio/video and/or controller frames may be retried 4 or more times, while command frames may be retried at least 10 times. Retries may be deferred until subsequent transactions are to be executed, in order to prevent skid.

Certain embodiments provide high-throughput aggregation in which an Aggregated Mac Protocol Data Unit (A-MPDU) may be transmitted as an Aggregated Mac Service Data Unit (A-MSDU), thereby providing incremental savings per frame. For example, preamble (36 microseconds), SIFS (16 microseconds), ACK Time (28 microseconds), SIFS (16 microseconds), and/or backoff (94.5 microseconds) need not be used, thereby saving 190.5 microseconds, which is 2.3% of an 8 millisecond super-frame 202. Aspects of the current disclosure enable more efficient utilization of airtime, with higher payload bits per unit time than can be achieved with single frame transmission. Furthermore, retries are also aggregated, providing further efficiency advantages.

Figure 3:
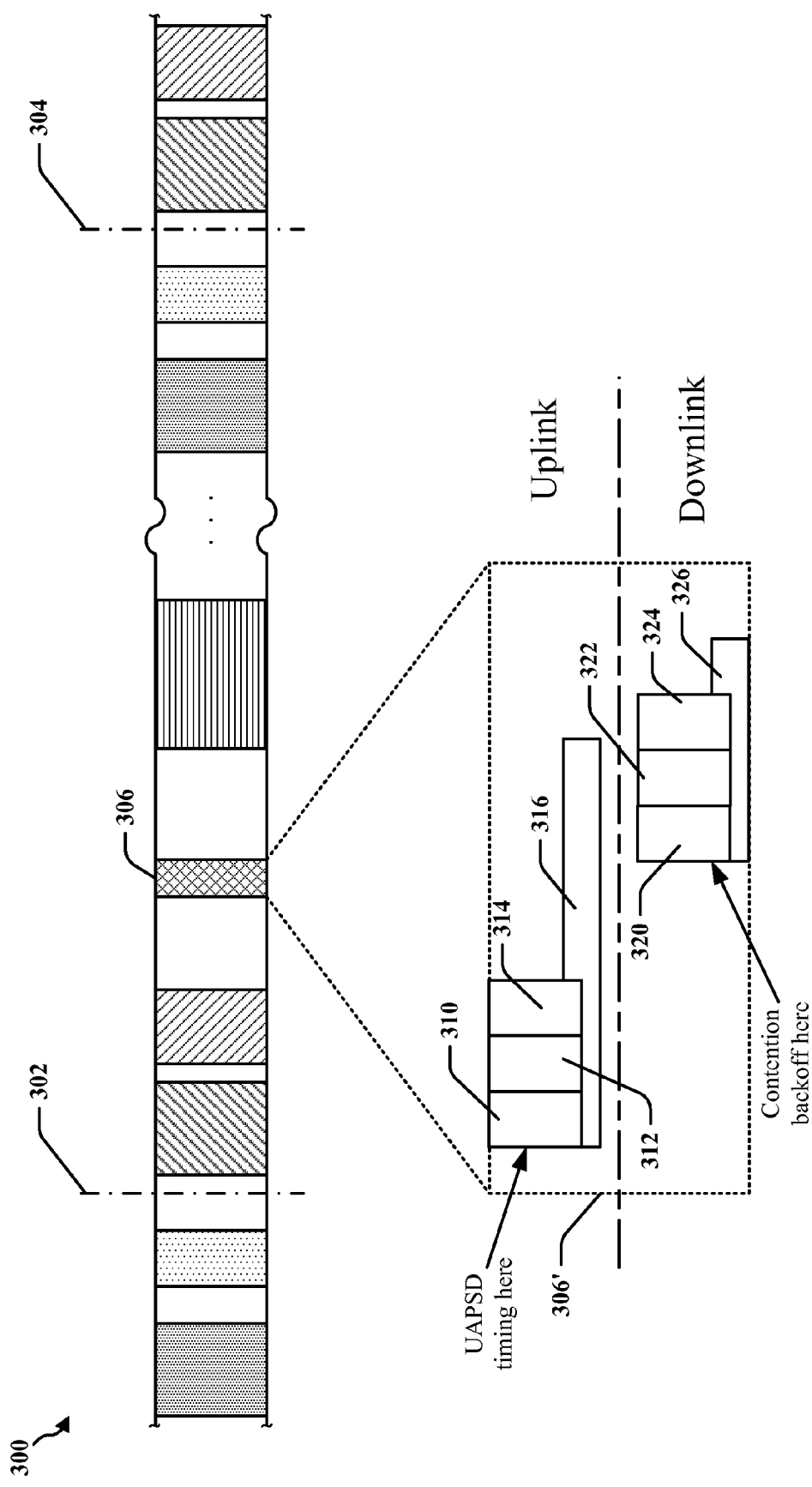
FIG. 3 is a timing diagram illustrating a super-frame.

FIG. 3 is a drawing 300 depicting an A-MPDU exchange that can provide greatly reduced airtime and provide more available time for retries. Hardware resources in AT 102 and/or AT 106 may be exploited to obtain an optimal implementation. The use of U-APSD and triggering may enable a burst of packets belonging to more than one TID to be sent when the final frame of a burst sent by AP 104 uses U-APSD trigger TID, while others do not use U-APSD trigger TID. Sequence numbering remains specific to the TID.

Expedited turnaround time for both downlink and uplink may be accomplished when hardware packet inspection detects triggerable TIDs in the receive path. A per-packet retry configuration and per-packet transmit power control may be employed. Linear power control from −10 dBm to 5 dBm may be employed.

In some embodiments, a transmit packet outcome indication allows software or firmware to retry frames across sleep periods. Otherwise hardware would be used to retry frames in current slot, and excessive retry would be indicated if all such retries fail, packet re-queued to software queue.

Certain embodiments enable a low sleep/wake latency of both radio and target CPU infrastructure. Timers may be to TSF. AP 104 may use a deep buffer that can handle UAPSD turnaround with 12 or more client ATs 102, 106.

Figure 4:
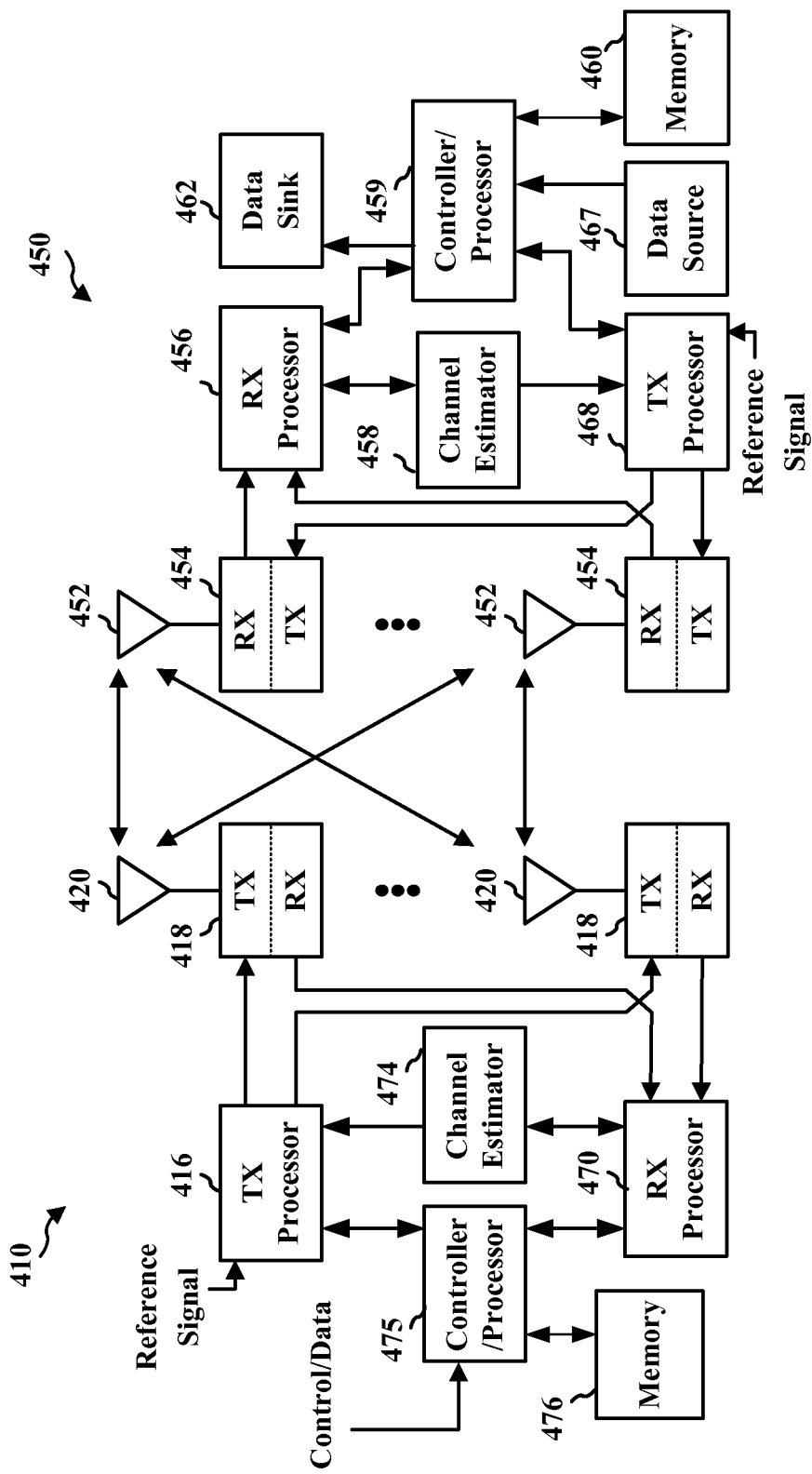
FIG. 4 is a diagram illustrating an example of an access point and an access terminal in a wireless access network.

FIG. 4 is a block diagram illustrating an AP 410 in communication with an AT 450 in an access network. In the DL, packets from a core network are provided to a controller/processor 475. The controller/processor 475 implements various functionalities including, for example, header compression, ciphering, packet segmentation and reordering, multiplexing between logical and transport channels, and radio resource allocations to the AT 450 based on various priority metrics. The controller/processor 475 may also responsible for retransmission of lost packets, and signaling to the AT 450.

Transmit (TX) processor 416 may implement various signal processing functions for the physical layer. The signal processing functions may include coding and interleaving to facilitate forward error correction (FEC) at the AT 450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). In one example, the coded and modulated symbols are split into parallel streams, and each stream may be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the AT 450. Each spatial stream may then be provided to a different antenna 420 via a separate transmitter 418TX. Each transmitter 418TX modulates an RF carrier with a respective spatial stream for transmission.

At the AT 450, one or more receivers 454RX receive a signal through respective antennae 452. Each receiver 454RX may recover information modulated onto an RF carrier and may provide the information to the receive (RX) processor 456. The RX processor 456 typically implements various signal processing functions of the physical layer. For example, the RX processor 456 may perform spatial processing on the information to recover any spatial streams destined for the AT 450. If multiple spatial streams are destined for the AT 450, they may be combined by the RX processor 456 into a single OFDM symbol stream. The RX processor 456 then may convert the OFDM symbol stream from the time-domain to the frequency domain using a Fast Fourier Transform (FFT). The frequency domain signal may comprise a separate OFDM symbol stream for each subcarrier of the OFDM signal. The symbols on each subcarrier, and the reference signal, may be recovered and demodulated by determining the most likely signal constellation points transmitted by the AP 410. These soft decisions may be based on channel estimates computed by the channel estimator 458. The soft decisions are then decoded and deinterleaved to recover the data and control signals that were originally transmitted by the AP 410 on the physical channel. The data and control signals are then provided to the controller/processor 459.

The controller/processor 459 can be associated with a memory 460, which may comprise non-transitory storage that stores program codes and data. The memory 460 may be referred to as a computer-readable medium. In the UL, the controller/processor 459 typically provides demultiplexing between transport and logical channels, packet reassembly, deciphering, header decompression, control signal processing to recover upper layer packets from the core network. Packets may then be provided to a data sink 462, which may include one or more applications, etc. Various control signals may also be provided to the data sink 462 for further processing. The controller/processor 459 may also be responsible for error detection using an acknowledgement (ACK) and/or negative acknowledgement (NACK) protocol to support HARQ operations.

In the UL, a data source 467 may be used to provide packets to the controller/processor 459. The data source 467 may comprise various protocol layers, and may include applications. Similar to the functionality described in connection with the DL transmission by the AP 410, the controller/processor 459 implements various functions and may provide header compression, ciphering, packet segmentation and reordering, and multiplexing between logical and transport channels based on radio resource allocations by the AP 410. The controller/processor 459 may also be responsible for retransmission of lost packets, and signaling to the AP 410.

Channel estimates derived by a channel estimator 458 from a reference signal or feedback transmitted by the AP 410 may be used by the TX processor 468 to select the appropriate coding and modulation schemes, and to facilitate spatial processing. The spatial streams generated by the TX processor 468 are provided to different antenna 452 via separate transmitters 454TX. Each transmitter 454TX may modulate an RF carrier with a respective spatial stream for transmission.

The UL transmission is processed at the AP 410 in a manner similar to that described in connection with the receiver function at the AT 450. Each receiver 418RX receives a signal through its respective antenna 420. Each receiver 418RX recovers information modulated onto an RF carrier and provides the information to a RX processor 470. The RX processor 470 may implement the physical layer.

The controller/processor 475 can be associated with a memory 476 that stores program codes and data. The memory 476 may comprise non-transitory storage that may be referred to as a computer-readable medium. In the UL, the control/processor 475 provides demultiplexing between transport and logical channels, packet reassembly, deciphering, header decompression, control signal processing to recover upper layer packets from the AT 450. Packets from the controller/processor 475 may be provided to the core network. The controller/processor 475 is also responsible for error detection using an ACK and/or NACK protocol, for example.

Figure 5:
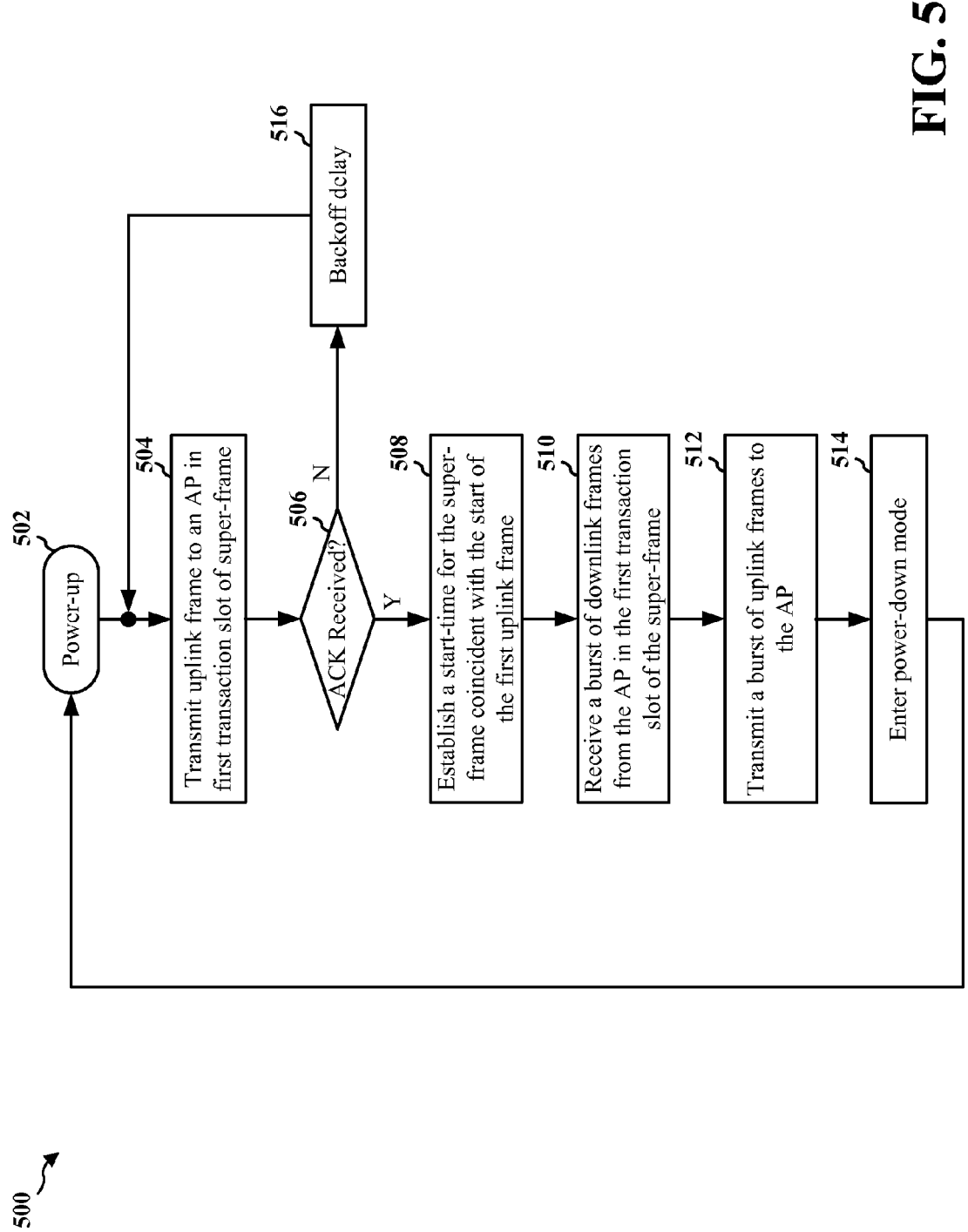
FIG. 5 is a flow chart of a method of communication.

FIG. 5 is a flow chart 500 of a method of wireless communication. The method may be performed by an AT 102 or 106.

At step 502, the AT 102 or 106 may power up a transceiver and/or other elements of a radio frequency interface. The AT 102 and or 106 may comprise one or more processors, at least one of which may also be powered up in order to enable RF communication.

At step 504, the AT 102 or 106 transmits a first uplink frame 220 to an access point 104 in a first transaction slot of a super-frame 202. The first uplink frame 220 may include a first over-allocated uplink NAV 226. The access point 104 may be configured to ignore the over-allocated uplink NAV 226.

At step 506, the AT 102 or 106 may wait for an acknowledgement of the first uplink frame 220. The acknowledgement may be transmitted by an AP 104 when no collision occurs with the uplink frame, where collisions are caused when two or more ATs transmit at the same time. An received acknowledgement can indicate that no collision occurred.

At step 508, the AT 106 or 106 establishes a start-time 206 or 240 (respectively) for the super-frame coincident with the start of the first uplink frame (e.g. frame 220) if the access point 104 has acknowledged the first uplink frame.

At step 510, the AT 102 or 106 receives a burst of downlink frames 230, 232, and 234 from the access point 104 in the first transaction slot 210 or 204 (respectively) of the super-frame 202. The burst of downlink frames 230, 232, and 234 may be associated with an over-allocated downlink NAV (e.g. NAV 238) that reserve a time which exceeds a time required to transmit the burst of downlink frames 230, 232, and 234 and acknowledgements of the burst of downlink frames.

At step 512, the AT 102 or 106 transmitting a burst of uplink frames 222, 224 to the access point 104. Transmission of the burst of uplink frames 222, 224 begins within the time reserved by the downlink NAV 238 and subsequent to receiving the burst of downlink frames 230, 232, and 234.

At step 514, the AT 102 or 106 may enter a power-down mode after termination of the first transaction slot 210 or 204. The AT 102 or 106 may remain in the power-down mode for the remainder of the super-frame 202. The AT 102 or 106 may exit the power down mode at 502 before ending of the super-frame 202 in order to be able to transmit a first frame of a next super-frame 202'.

If at step 506, the AT 102 or 106 did not receive, determine or detect an acknowledgement of the first uplink frame, then the AT 102 or 106 may wait for a predetermined backoff delay period at step 516 before returning to step 504 to retransmit the first uplink frame to the AP. The AT 102 or 106 may hibernate or otherwise power down during at least a portion of the backoff period. The AT 102 or 106 may monitor transmissions during the backoff period. The AT 102 or 106 may repeat the steps of transmitting a first uplink frame and determining if an acknowledgement has been received until an available transmission slot is obtained.

In some embodiments, wherein the burst of uplink frames 222, 224 is transmitted to the AP 104 with a NAV that is not over-allocated. The uplink NAV may exceed a time required to receive acknowledgement of the burst of uplink frames by at least one frame duration. The downlink NAV may exceed a time required to transmit an acknowledgement of the burst of downlink frames and at least one other frame.

Figure 6:
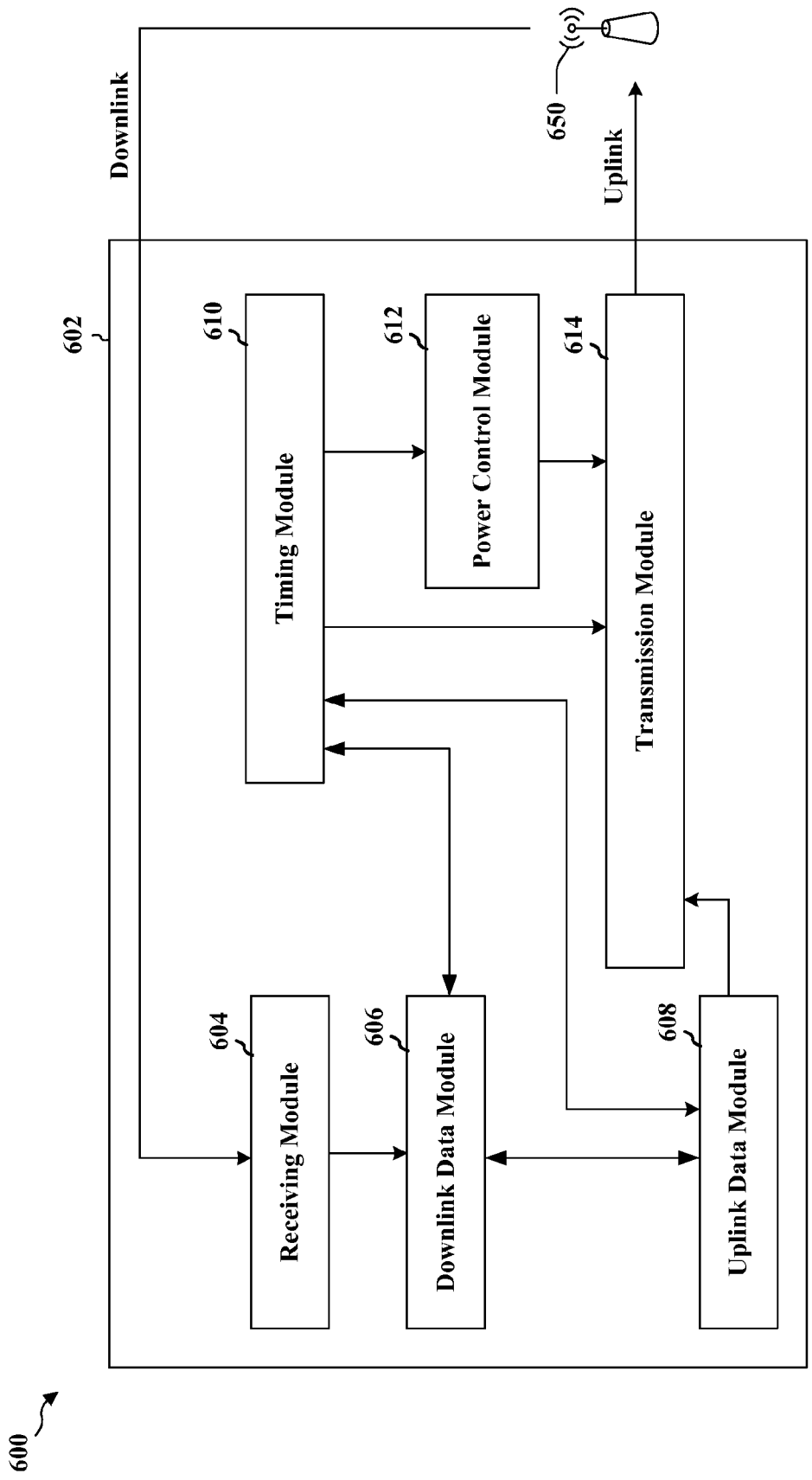
FIG. 6 is a conceptual data flow diagram illustrating the data flow between different modules/means/components in an exemplary apparatus.

FIG. 6 is a conceptual data flow diagram 600 illustrating the data flow between different modules/means/components in an exemplary apparatus 602. The apparatus may be an AT 102, 106. The apparatus includes a module 604 that monitors and receives frames transmitted by an AP 104 including acknowledgements, a module 606 that receives a burst of downlink frames from the AP 104, a module 608 that transmits a burst of uplink frames to the AP 104, a module 614 that controls and transmissions to the AP 104 through transceiver/RF transmitter 650, a timing module 610 that establishes a start-time for the super-frame, and a power control module 612 that powers down and/or powers up RF elements 650.

The apparatus may include additional modules that perform each of the steps of the algorithm in the aforementioned flow chart of FIG. 5. As such, each step in the aforementioned flow chart of FIG. 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 7:
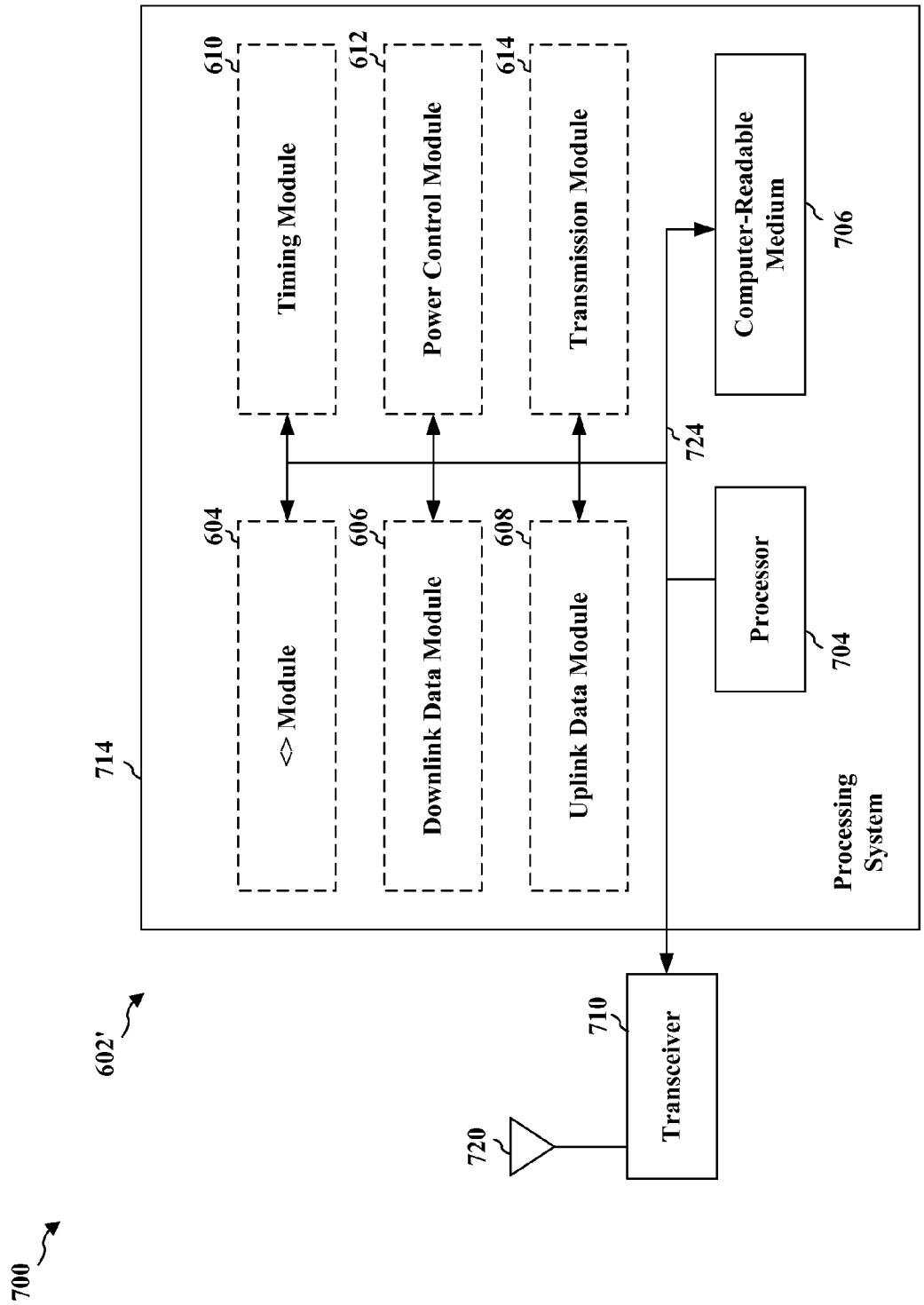
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 704, the modules 604, 606, 608, 610, 612, 614, and the computer-readable medium 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The processing system 714 includes a processor 704 coupled to a computer-readable medium 706. The processor 704 is responsible for general processing, including the execution of software stored on the computer-readable medium 706. The software, when executed by the processor 704, causes the processing system 714 to perform the various functions described supra for any particular apparatus. The computer-readable medium 706 may also be used for storing data that is manipulated by the processor 704 when executing software. The processing system further includes at least one of the modules 604, 606, 608, 610, 612, and 614. The modules may be software modules running in the processor 704, resident/stored in the computer readable medium 706, one or more hardware modules coupled to the processor 704, or some combination thereof. The processing system 714 may be a component of the UE 450 and may include the memory 460 and/or at least one of the TX processor 468, the RX processor 456, and the controller/processor 459.

In one configuration, the apparatus 602/602' for wireless communication includes means 608, 614 for transmitting a first uplink frame to an AP 104 in a first transaction slot of a super-frame 202, means 610 for establishing a start-time for the super-frame, means 604, 606 for receiving a burst of downlink frames from the access point in the first transaction slot of the super-frame 202, and means 608, 610, 614 for transmitting a burst of uplink frames to the AP 604 within the time reserved by a downlink NAV. The aforementioned means may be one or more of the aforementioned modules of the apparatus 602 and/or the processing system 714 of the apparatus 602' configured to perform the functions recited by the aforementioned means. As described supra, the processing system 714 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

The various aspects of a mobile device receiver described thus far may be integrated into a variety of devices, including by way of example, a wireless device. A wireless device may include various components that perform functions based on signals (e.g., comprising information such as data) that are transmitted by or received at the wireless device. For example, a wireless headset may include a transducer configured to provide an audio output to a user. A wireless watch may include a user interface configured to provide an indication to a user. A wireless sensing device may include a sensor configured to provide an audio output to a user or configured to provide audio to be transmitted via the transmitter.

A wireless device may communicate via one or more wireless communication links that are based on or otherwise support any suitable wireless communication technology. For example, according to certain aspects a wireless device may associate with a network. According to certain aspects the network may comprise a personal area network (e.g., supporting a wireless coverage area on the order of 30 meters) or a body area network (e.g., supporting a wireless coverage area on the order of 10 meters) implemented using ultra-wideband technology or some other suitable technology. According to certain aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

According to certain aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

The components described herein may be implemented in a variety of ways. For example, an apparatus may be represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof. Such an apparatus may include one or more modules that may perform one or more of the functions described above with regard to various figures.

As noted above, according to certain aspects these components may be implemented via appropriate processor components. These processor components may be implemented, at least in part, using structure as taught herein. According to certain aspects a processor may be adapted to implement a portion or all of the functionality of one or more of these components.

As noted above, an apparatus may comprise one or more integrated circuits. For example, a single integrated circuit may implement the functionality of one or more of the illustrated components, while in other aspects more than one integrated circuit may implement the functionality of one or more of the illustrated components.

In addition, the components and functions described herein may be implemented using any suitable means. Such means also may be implemented, at least in part, using corresponding structure as taught herein. For example, the components described above may be implemented in an "ASIC" and also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Bluray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

Further disclosure is included in the Appendix.

The invention claimed is:

1. An access terminal, comprising:
a transceiver configured to
transmit uplink frames to an access point in a first transaction slot of a super-frame, and
receive downlink frames from the access point in the first transaction slot of the super-frame,
wherein one or more of the uplink frames and one or more of the downlink frames are associated with over-allocated network allocation vectors (NAVs) that reserve a transmission time which exceeds a time required to transmit acknowledgements of the downlink frames or receive acknowledgement of the uplink frames, respectively;
a processing system configured to
cause the transceiver to transmit a first uplink frame to the access point with an over-allocated uplink NAV,
establish a start-time for the super-frame coincident with commencement of the first uplink frame if the access point acknowledges the first uplink frame, and
extract data from two or more downlink frames in a burst received from the access point after the access point acknowledges the first uplink frame, wherein the two or more downlink frames are associated a over-allocated downlink NAV;
wherein the transceiver is configured to ignore the over-allocated downlink NAV.

2. The access terminal of claim 1, wherein the access point is configured to ignore the over-allocated uplink NAV.

3. The access terminal of claim 1, wherein the processing system is configured to power down the transceiver after the first transaction slot until termination of the super-frame.

4. The access terminal of claim 3, wherein the transceiver transmits at least one uplink frame during a first transaction slot of a next super-frame.

5. The access terminal of claim 1, wherein the processing system is configured to repetitively cause the transceiver to retransmit the first uplink frame to the access point with the over-allocated uplink NAV perform after a predefined minimum delay if the access point does not acknowledge receipt of the first uplink frame.

6. The access terminal of claim 1, wherein the processing system is configured to establish the start-time for the super-frame through contention if the access point does not acknowledge receipt of the first uplink frame.

7. The access terminal of claim 1, wherein the transceiver is configured to transmit a burst of uplink frames to the access point in the first transaction slot after receiving the downlink frames from the access point.

8. The access terminal of claim 7, wherein the burst of uplink frames is transmitted to the access point with a NAV that is not over-allocated.

9. The access terminal of claim 1, wherein at least one over-allocated NAV exceeds a time required to transmit acknowledgements of the downlink frames or receive acknowledgement of the uplink frames by at least one frame duration.

10. The access terminal of claim 1, wherein the access point serves a plurality of access terminals, and wherein each of the plurality of access terminals recognizes a different start-time for the super-frame.

11. A method for wireless communication, comprising:
   transmitting a first uplink frame to an access point in a first transaction slot of a super-frame, the first uplink frame including an over-allocated uplink network allocation vector (NAV);
   establishing a start-time for the super-frame coincident with commencement of the first uplink frame if the access point acknowledges the first uplink frame;
   receiving a burst of downlink frames from the access point in the first transaction slot of the super-frame, wherein the burst of downlink frames is associated with an over-allocated downlink NAV that reserve a time which exceeds a time required to transmit the burst of downlink frames and acknowledgements of the burst of downlink frames; and
   transmitting a burst of uplink frames to the access point, wherein transmission of the burst of uplink frames begins within the time reserved by the over-allocated downlink NAV and subsequent to receiving the burst of downlink frames.

12. The method of claim 11, wherein the access point is configured to ignore the over-allocated uplink NAV.

13. The method of claim 11, further comprising:
   entering a power-down mode after termination of the first transaction slot; and
   exiting the power-down mode until termination of the super-frame.

14. The method of claim 13, further comprising transmitting at least one uplink frame during a first transaction slot of a next super-frame.

15. The method of claim 11, wherein an acknowledgement of the first uplink frame is not received and further comprising:
   waiting for a predetermined backoff period;
   retransmitting the first uplink frame to the access point with the over-allocated uplink NAV;
   determining if the access point has acknowledged the first uplink frame; and
   repeating the waiting, retransmitting and determining steps if the access point is determined not to have acknowledged the first uplink frame.

16. The method of claim 11, wherein the burst of uplink frames is transmitted to the access point with a NAV that is not over-allocated.

17. The method of claim 11, wherein the over-allocated uplink NAV exceeds a time required to receive acknowledgement of the burst of uplink frames by at least one frame duration.

18. The method of claim 11, wherein the time reserved by the over-allocated downlink NAV exceeds a time required to transmit an acknowledgement of the burst of downlink frames and at least one other frame.

19. An apparatus for wireless communication, comprising:
   means for transmitting a first uplink frame to an access point in a first transaction slot of a super-frame, the first uplink frame including an over-allocated uplink network allocation vector (NAV);
   means for establishing a start-time for the super-frame coincident with commencement of the first uplink frame if the access point acknowledges the first uplink frame;
   means for receiving a burst of downlink frames from the access point in the first transaction slot of the super-frame, wherein the burst of downlink frames is associated with an over-allocated downlink NAV that reserves a time which exceeds a time required to transmit the burst of downlink frames and acknowledgements of the burst of downlink frames; and
   means for transmitting a burst of uplink frames to the access point within the time reserved by the over-allocated downlink NAV subsequent to receiving the burst of downlink frames.

20. The apparatus of claim 19, wherein the access point is configured to ignore the over-allocated uplink NAV.

21. The apparatus of claim 19, wherein the means for transmitting is configured to power down after the first transaction slot until termination of the super-frame.

22. The apparatus of claim 21, wherein the means for transmitting transmits at least one uplink frame during a first transaction slot of a next super-frame.

23. The apparatus of claim 19, wherein the means for transmitting is configured to repetitively retransmit the first uplink frame to the access point with the over-allocated uplink NAV perform after a predefined minimum delay if the access point does not acknowledge receipt of the first uplink frame.

24. The apparatus of claim 19, wherein the start-time for the super-frame is established through contention if the access point does not acknowledge receipt of the first uplink frame.

25. The apparatus of claim 19, wherein the means for transmitting is configured to transmit a burst of uplink frames to the access point in the first transaction slot after receiving the downlink frames from the access point.

26. The apparatus of claim 25, wherein the burst of uplink frames is transmitted to the access point with a NAV that is not over-allocated.

27. The apparatus of claim 19, wherein at least one over-allocated NAV exceeds a time required to transmit acknowledgements of the downlink frames or receive acknowledgement of the uplink frames by at least one frame duration.

28. The apparatus of claim 19, wherein the access point serves a plurality of access terminals, and wherein each of the plurality of access terminals recognizes a different start-time for the super-frame.

29. A computer program product, comprising:
   a non-transitory computer-readable medium comprising code for:
      transmitting a first uplink frame to an access point in a first transaction slot of a super-frame, the first uplink frame including an over-allocated uplink network allocation vector (NAV);
      establishing a start-time for the super-frame coincident with commencement of the first uplink frame if the access point acknowledges the first uplink frame;
      receiving a burst of downlink frames from the access point in the first transaction slot of the super-frame, wherein the burst of downlink frames is associated with an over-allocated downlink NAV that reserve a time which exceeds a time required to transmit the burst of downlink frames and acknowledgements of the burst of downlink frames; and transmitting a burst of uplink frames to the access point within the time reserved by the over-allocated downlink NAV subsequent to receiving the burst of downlink frames.

30. The computer program product of claim 29, wherein the access point is configured to ignore the over-allocated uplink NAV.

31. The computer program product of claim 29, further comprising:

entering a power-down mode after termination of the first transaction slot; and exiting the power-down mode until termination of the super-frame.

32. The computer program product of claim 31, further comprising transmitting at least one uplink frame during a first transaction slot of a next super-frame.

33. The computer program product of claim 29, wherein an acknowledgement of the first uplink frame is not received and further comprising:

waiting for a predetermined backoff period;

retransmitting the first uplink frame to the access point with the over-allocated uplink NAV;

determining if the access point has acknowledged the first uplink frame; and repeating the waiting, retransmitting and determining steps if the access point is determined not to have acknowledged the first uplink frame.

34. The computer program product of claim 29, wherein the burst of uplink frames is transmitted to the access point with a NAV that is not over-allocated.

35. The computer program product of claim 29, wherein the over-allocated uplink NAV exceeds a time required to receive acknowledgement of the burst of uplink frames by at least one frame duration.

36. The computer program product of claim 29, wherein the time reserved by the over-allocated downlink NAV exceeds a time required to transmit an acknowledgement of the burst of downlink frames and at least one other frame.

\* \* \* \* \*